Patented Mar. 10, 1936

2,033,555

UNITED STATES PATENT OFFICE 2,033,555

PURIFICATION OF APOCUPREINE

Benjamin L. Souther, Allison Park, Courtland L. Butler and Leonard H. Cretcher, Pittsburgh, Pa., assignors to Mellon Institute of Industrial Research, a corporation of Pennsylvania No Drawing. Application May 16, 1935, Serial No. 21,832

2 Claims. (Cl. 260—26)

This invention consists in a method of purifying apocupreine.

Apocupreine is a substance of medical importance; and, specifically, it is recognized to be of pneumococcidal value. In an application for Letters Patent of the United States, Serial No. 754,090, filed November 21, 1934, by Leonard H. Cretcher, Courtland L. Butler, and Alice G. Renfrew, a method of preparation and purification of apocupreine is described. In a paper by Henry and Solomon published in the Journal of the Chemical Society for the year 1934, page 1923, another method is described. The method of our invention is believed to be more convenient than either of these, and is productive of an article of higher purity.

Crude apocupreine, such, for example, as may be prepared by the hydrolysis of quinine with sulphuric acid, according to the teaching of Jarzynski, Ludwiczakowna, and Suszko (Rec. trav. chim. LII, 839—1933), is dissolved in absolute methyl or ethyl alcohol (1 cc. per gm.), and to the solution from 10 to 12 volumes of ether are added. Precipitation follows, and, after sedimentation, the clear supernatant liquor (B) is decanted. The precipitate (A) is then dried and is treated again, in like manner as before, with alcohol and ether. Again after precipitation and sedimentation the supernatant liquid (D) is decanted. The second precipitate is discarded. The two supernatants (B and D) are combined and evaporated to dryness, and the remaining solid material is treated, as before, with alcohol and ether. Again after precipitation and sedimentation the supernatant liquor (F) is decanted and the precipitate (E) is discarded.

The new supernatant (F) contains the purified base. It may be evaporated to dryness and is then suitable for alkylation. 200 g. batches of crude apocupreine yield from 133 to 161 g. of the purified alkaloid, having a specific rotation of about $-202°$. (Sodium light; $1=1.c=1$ in absolute alcohol, for all rotations.)

Instead of evaporating to dryness the supernatant F may be concentrated to about one third of its original volume; and then, being left standing over night, crystallization will have occurred. The yield of such crystalline article from the initial batch of 200 g. of crude material is 61.5 g. The specific rotation is $-203°$ to $-204°$.

*Analysis.*—Calculation for $C_{19}H_{22}O_2N_2$, nitrogen should equal 9. The amount found was 8.6. The formation in the cinchona series of molecular compounds is of common occurrence, and the crystalline apocupreine of which analysis is given is probably such a compound—since its rotation is midway between the $-215°$ and $-194°$ reported for the isomeric $\alpha$- and $\beta$-apocupreines.

We claim as our invention:

1. The method herein described of purifying crude apocupreine which consists in dissolving in alcohol, precipitating impurities by the addition of ether, and decanting the supernatant.

2. The method herein described of producing pure apocupreine in crystalline form which consists in dissolving crude apocupreine in alcohol, precipitating impurities by the addition of ether, decanting the supernatant, condensing and allowing crystallization to follow.

BENJAMIN L. SOUTHER.
COURTLAND L. BUTLER.
LEONARD H. CRETCHER.